United States Patent
Saieg et al.

(10) Patent No.: US 7,497,293 B2
(45) Date of Patent: Mar. 3, 2009

(54) INTERLOCK FOR SLIDER LOCKING PIN HANDLE

(75) Inventors: Steven George Saieg, Rochester Hills, MI (US); Rodney P. Ehrlich, Monticello, IN (US)

(73) Assignee: ArvinMeritor Technology, LLC, Troy, MI (US)

( * ) Notice: Subject to any disclaimer, the term of this patent is extended or adjusted under 35 U.S.C. 154(b) by 408 days.

(21) Appl. No.: 11/328,724

(22) Filed: Jan. 10, 2006

(65) Prior Publication Data

US 2006/0170178 A1    Aug. 3, 2006

Related U.S. Application Data

(60) Provisional application No. 60/643,016, filed on Jan. 11, 2005.

(51) Int. Cl.
*B62D 61/12* (2006.01)
*B62D 53/06* (2006.01)

(52) U.S. Cl. ..................... 180/209; 280/149.2
(58) Field of Classification Search .......... 180/209, 180/24.02, 271, 286; 280/149.2, 432
See application file for complete search history.

(56) References Cited

U.S. PATENT DOCUMENTS

| | | | | |
|---|---|---|---|---|
| 2,866,511 | A * | 12/1958 | Niederoest | 180/286 |
| 4,273,347 | A | 6/1981 | Hulse | |
| 4,641,846 | A * | 2/1987 | Ehrhart | 280/149.2 |
| 5,199,732 | A | 4/1993 | Lands | |
| 5,314,201 | A | 5/1994 | Wessels | |
| 5,346,233 | A * | 9/1994 | Moser | 280/149.2 |
| 5,465,990 | A | 11/1995 | Wessels | |
| 5,476,277 | A | 12/1995 | Schueman | |
| 5,505,475 | A * | 4/1996 | Turner | 280/149.2 |
| 5,531,467 | A | 7/1996 | Schueman | |
| 6,384,716 | B1 | 5/2002 | Eckelberry | |
| 6,702,310 | B2 * | 3/2004 | Browning | 280/149.2 |

FOREIGN PATENT DOCUMENTS

| | | |
|---|---|---|
| GB | 424218 | 2/1935 |
| GB | 907927 | 10/1962 |
| WO | WO 00/43255 | 7/2000 |

* cited by examiner

*Primary Examiner*—John Q. Nguyen
*Assistant Examiner*—Nicole Verley
(74) *Attorney, Agent, or Firm*—Carlson, Gaskey & Olds

(57) ABSTRACT

An interlock for a slider incorporates a cover that moves between a covered position and an uncovered position. In the covered position, the cover prevents access and movement of a handle for actuating locking pins on the slider. The cover may be pivoted to an uncovered position at which the handle can be actuated. Generally, the handle is pulled away from a trailer frame for the slider to move the locking pins out of holes in the trailer frame. When the cover has moved away from the covered position, the cover actuates a valve member that sets at least one park brake. To release the park brakes, the cover must be moved back to the covered position. The cover cannot be moved back to the covered position until the handle is in a position indicative of the locking pins being fully received in the holes in the trailer frame. In this manner, the cover ensures that the locking pins are fully engaged in the trailer frame, and further provides a visual feedback to an operator of why the park brakes may not be released in the event the locking pins are not fully engaged.

21 Claims, 4 Drawing Sheets

INTERLOCK FOR SLIDER LOCKING PIN HANDLE

RELATED APPLICATIONS

This application claims priority to U.S. Provisional Application 60/643,016, filed Jan. 11, 2005.

BACKGROUND OF THE INVENTION

This application relates to a movable cover for a slider handle on a trailer. The cover must be moved to allow the slider handle to be actuated to withdraw slider locking pins. When the cover is moved, a valve is actuated to set the park brakes. In this manner, the invention ensures that a slider cannot begin to move unless the cover is returned with the slider locking pins fully engaged.

Sliders are mounted upon a trailer frame, and typically carry a pair of axles each having spaced wheels, and associated suspensions, brakes, etc. The slider is movable along the length of the trailer frame such that the slider can be positioned at various locations based upon the load and driving conditions. Typically, locking pins are movable within the slider, and into and out of a plurality of incrementally spaced holes in the trailer frame. To adjust slider position, the locking pins are moved to a release position, and the slider is then moved relative to the trailer frame to a desired adjusted position. The locking pins are then moved back into selected incrementally spaced holes on the trailer frame, which lock the slider relative to the trailer frame at the desired adjusted position.

There are concerns in the prior art, in that if the locking pins are not fully and properly engaged in the incrementally spaced holes, the slider may move relative to the trailer once the trailer begins to be driven. Thus, various interlocks, etc. have been proposed that will prevent movement if the locking pins are not fully engaged. While all of these proposals have their own merits and benefits, it would be desirable to provide an even more foolproof solution.

SUMMARY OF THE INVENTION

In the disclosed embodiment of this invention, a handle for actuating locking pins within a slider is provided with a cover. The handle cannot be actuated without first moving the cover away from a covered position. Once the cover has been moved away from the covered position, the handle can be actuated to actuate the locking pins. When the cover is moved from the covered position to an uncovered position, the cover actuates a valve. This valve sets the park brakes on a trailer. The slider may be adjusted relative to a trailer frame, and the handle may then again be actuated to lock the slider at a newly adjusted position. At this point, the cover is moved back to the covered position, and the park brakes are released. Notably, the cover is preferably positioned such that the cover cannot be moved to the covered position to release the park brakes, if the handle is not in a position indicative of the locking pins being fully engaged. That is, if the locking pins are only partially engaged, the handle will block movement of the cover to the covered position, preventing release of the park brakes. As a result, an operator is provided with a visual indication of why the park brakes have not been released, and is thus notified that the locking pins are not fully engaged.

In one disclosed embodiment, the cover is positioned outwardly of the handle to block access to the handle in the covered position. The cover preferably pivots relative to the handle to the uncovered position. In the uncovered position, the cover actuates a valve pin or plunger that in turn actuates the valve to release air heading to the park brakes. The park brakes are thus set. While the cover is in this uncovered position, the slider cannot move as the park brakes are set.

In a preferred embodiment, the cover pivots about an axis, such that a pin pivots with the cover. The pin is a part of a valve. With this embodiment, the cover need not contact any structure, but rather the rotational position of the cover controls the position of a pin, and thus achieves the airflow features described above. In this embodiment, the cover preferably pivots about an axis that is parallel to an axis along which the handle will be pulled.

These and other features of the present invention can be best understood from the following specification and drawings, the following of which is a brief description.

DETAILED DESCRIPTION OF THE PREFERRED EMBODIMENT

Figure 1:
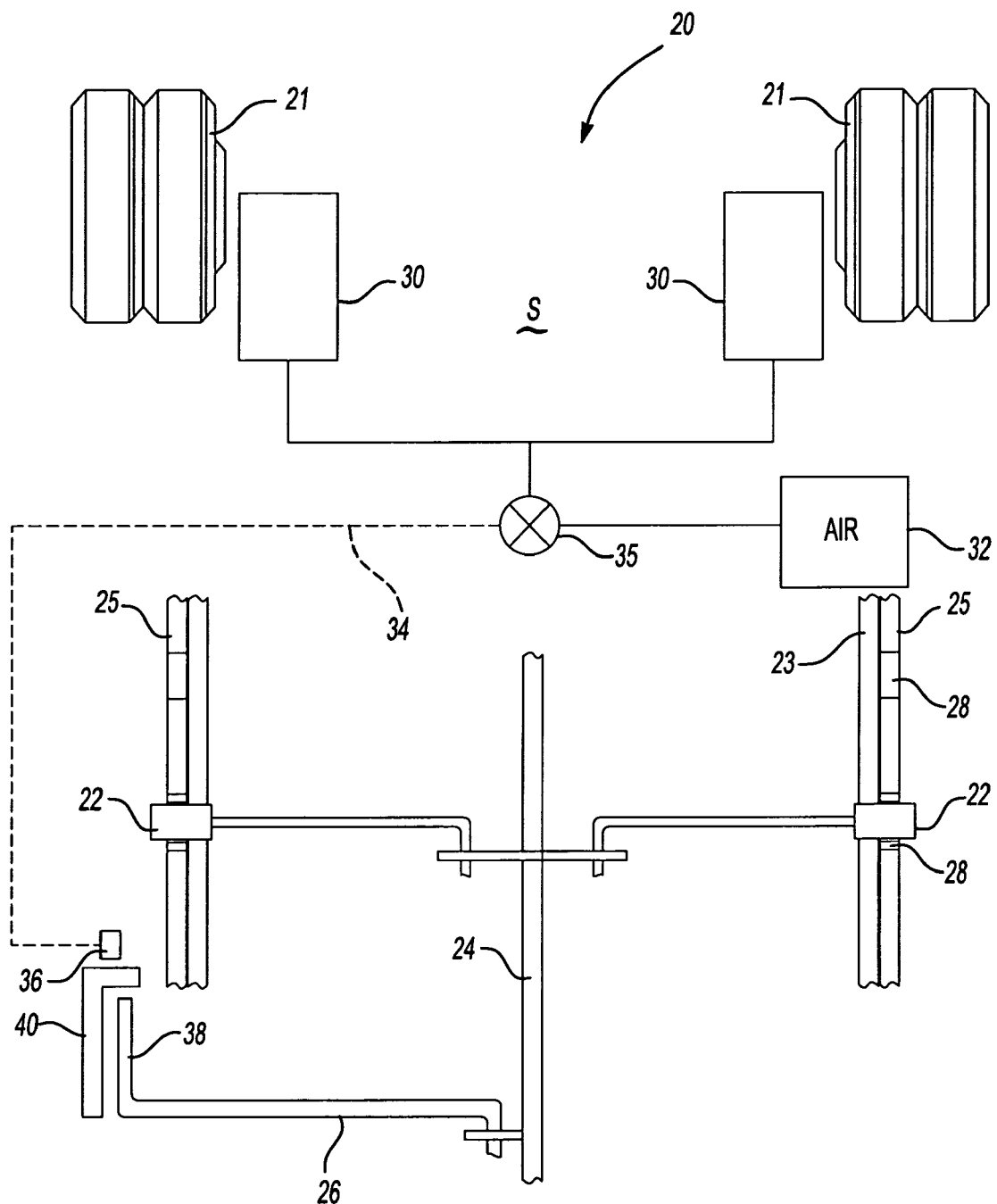
FIG. 1 is a schematic view of an inventive slider and trailer combination.

FIG. 1 shows a combination of a slider S and trailer T shown schematically at 20. A plurality of wheels 21 are associated with the slider S. The slider S is adjustable relative to the trailer T such that the wheels 21 can be positioned at any of a number of selected positions relative to the trailer T. As known, the slider S typically includes two axles each carrying opposed wheels and related suspensions, brakes, etc.

As shown schematically in FIG. 1, a rotating shaft 24 moves locking pins 22 relative to a slider frame 23 and a trailer frame 25, and into and out of openings 28 in the trailer frame 25.

FIG. 1 is not intended to provide the detailed structure of the locking pins. The locking pins, and the mechanical transmission between the handle and the locking pins is much more complicated. However, those details form no portion of this invention, and all that is required for an understanding of this invention is a basic understanding of the interrelationship of the handle and the locking pins. A worker of ordinary skill in the art would understand the complete details of these type structures. Thus, the interrelationship of the components will only be described in its most basic detail.

A shaft 26 extends to a handle 38. As is known, the handle 38 may be pulled outwardly relative to the slider frame 23, or to the left as shown in FIG. 1, such that the locking pins 22 are moved outwardly of the openings 28. At that point, the slider S can be moved relative to the trailer T. The slider S is moved for reasons well known in the art, and essentially to position the wheels 21 of the slider S and the associated suspensions, etc. at a desired location along the trailer frame 25, selected dependent upon the load, etc. carried by the trailer T.

When the slider S is at a desired position, the handle 38 may be moved back inwardly, or to the right as shown in FIG. 1, and the rotating shaft 24 rotates counterclockwise forcing the locking pins 22 back into selected openings 28. The system as described above is shown schematically and is well known in the art. One concern in the prior art is that sometimes the locking pins 22 do not move fully into openings 28.

The present invention relates to an interlock structure including a cover 40 covering the handle 38, which prevents actuation of the handle 38 unless cover 40 is moved to an uncovered position. A valve pin 36 is actuated by the cover 40 when the cover 40 is in the uncovered position. The valve pin 36 causes a valve 35 to set park brakes 30 associated with the wheels 21. The plumbing of the valve 35 into an air source 32 for park brakes 30 is shown very schematically. A worker of ordinary skill in this art would recognize how to incorporate such a valve into existing air supply systems. Essentially, air from air source 32 is delivered to park brakes 30 to maintain the park brakes 30 in a released position. The valve 35 blocks this air flow and vents the park brakes 30. Thus, if the cover 40 is in the uncovered position, the park brakes 30 will be set. If a tractor driving the trailer T is actuated, the slider S will not move. This ensures that the trailer T will not move at higher speeds relative to the slider S.

Figure 2A:
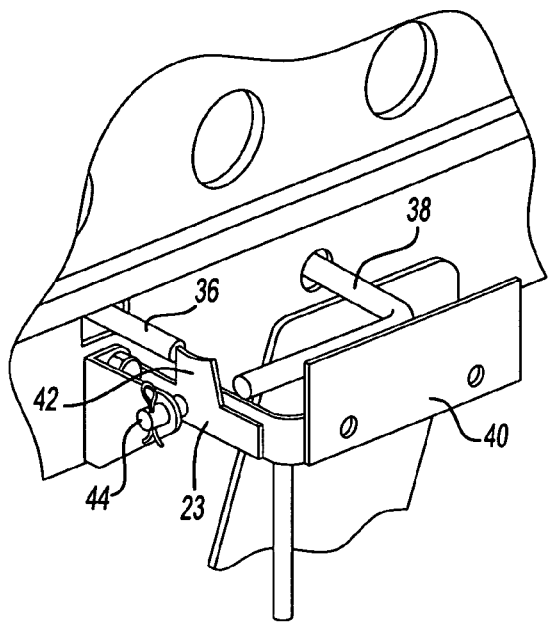
FIG. 2A is a perspective view of an interlock arrangement in the covered position.

As shown in FIG. 2A, the handle 38 is positioned inwardly of the cover 40. The cover 40 includes a cam portion 42, and a pivot pin 44 pivotably mounted in a portion of the slider frame 23. With the cover 40 in this position, an operator cannot access the handle 38, as the cover 40 is in the way. The operator cannot pull the handle 38 outwardly of the slider frame 23 with the cover 40 in this position. This is known as the covered position for purposes of this application.

Figure 2B:
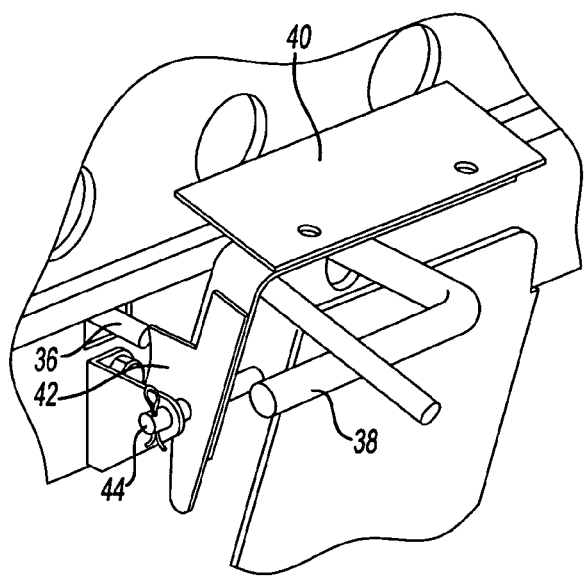
FIG. 2B shows the FIG. 2A interlock arrangement in an uncovered position.

As shown in FIG. 2B, when it is desired to release the locking pins 22, the cover 40 is initially pivoted about a pivot point, defined by pivot pin 44, to the uncovered position. At the uncovered position, the handle 38 is accessible. The cam portion 42 has now actuated valve pin 36. This has caused the valve 35 to set the park brakes 30. As long as the cover 40 is in this position, the trailer T cannot move because the park brakes 30 are set.

Figure 3A:
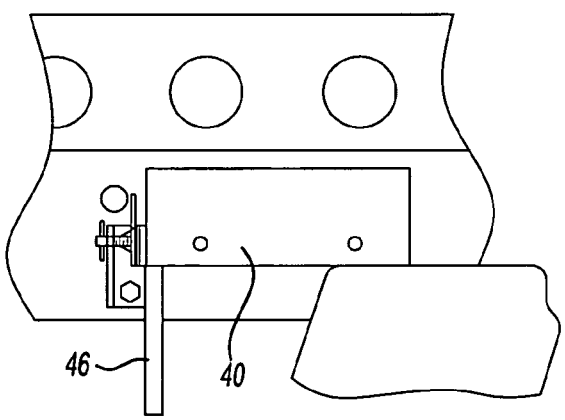
FIG. 3A is a side view of the interlock arrangement in the covered position
Figure 3B:
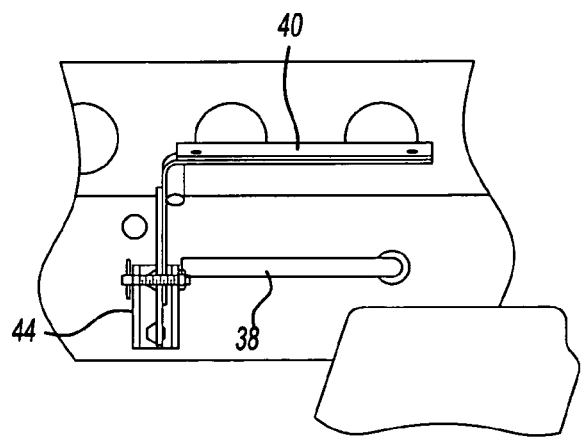
FIG. 3B is a side view of the interlock arrangement in the uncovered position.

FIG. 3A is a side view showing the cover 40 in the covered position. FIG. 3B is a side view showing the cover 40 in the uncovered position.

Figure 4A:
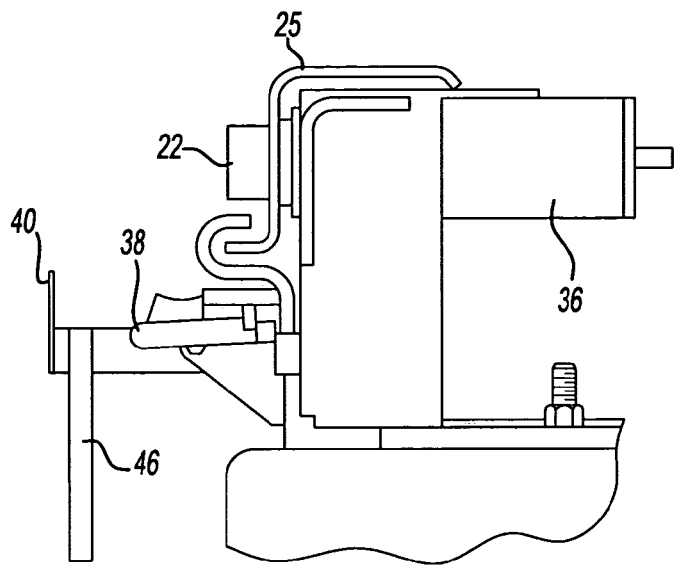
FIG. 4A is an end view of the interlock arrangement in the covered position.
Figure 4B:
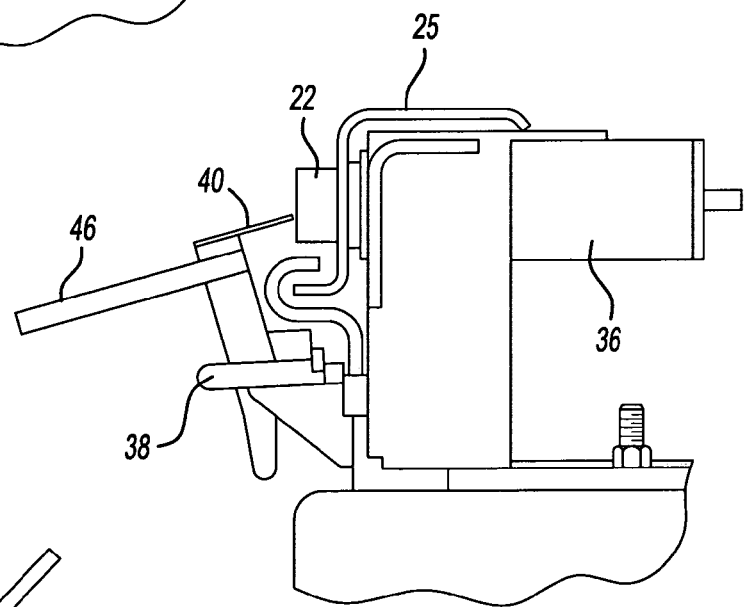
FIG. 4B is an end view of the interlock arrangement in the uncovered position.

FIG. 4A is an end view of the interlock structure showing the cover 40 in the covered position. FIG. 4B shows the cover 40 in an uncovered position.

Figure 4C:
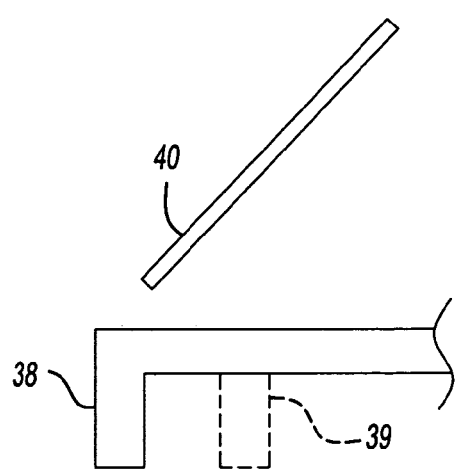
FIG. 4C shows a feature incorporated into the present invention.

FIG. 4C shows a main feature of the present invention. If the locking pins 22 are not fully received through the openings 28, the handle 38 blocks movement of the cover 40 to its covered position. That is, if the handle 38 was in a position indicative of the locking pins 22 being fully received in the openings 28, then the handle 38 would be at the position shown in phantom at 39 in FIG. 4C. At position 39, the cover 40 can return to the covered position. However, when the handle 38 remains spaced outwardly, such as when the locking pins 22 are not fully received in openings 28, the cover 40 cannot return to the covered position. In this case, the cover 40 would continue to actuate the valve 35, and the park brakes 30 would remain set. It is not until the cover 40 is returned to the covered position that the park brakes 30 will be released.

Figure 5:
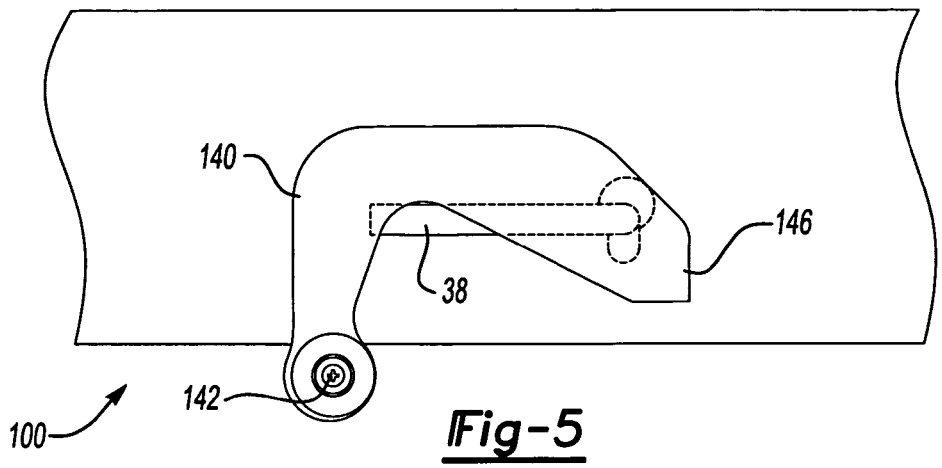
FIG. 5 shows a preferred embodiment in the covered position.
Figure 6:
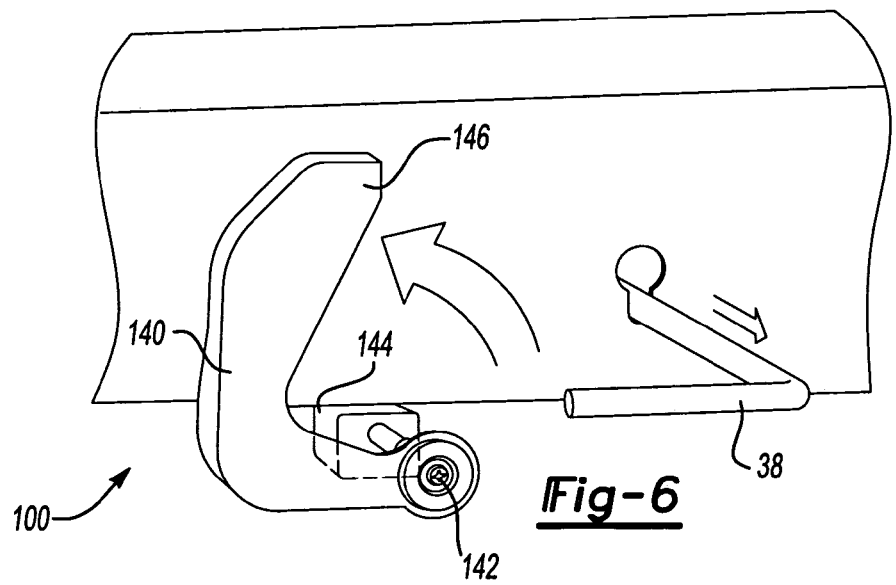
FIG. 6 shows the preferred embodiment in the uncovered position.

FIG. 5 shows an embodiment 100 wherein a cover 140 pivots about a pivot pin 142. An outer end 146 of the cover 140 is shown covering and blocking access to the handle 38. The cover 140 is shown having pivoted to the uncovered position in FIG. 6. The pin 142 pivots within a valve structure 144 only after the pin 142 has been pushed in. Within the valve structure 144, the position of the pin 142 controls the flow of air similar to the position of the valve 36. Again, a worker of ordinary skill in the art would recognize how to incorporate the valve into the basic plumbing system of the slider such that the goals of this invention are achieved. Valves that have different valving positions based upon the specific structure of a rotating pin are known in the art. As an example, one such valve is available from Alkon Corporation. The valve is activated by pushing in the pin. Turning the pin locks the pin position.

Figure 7:
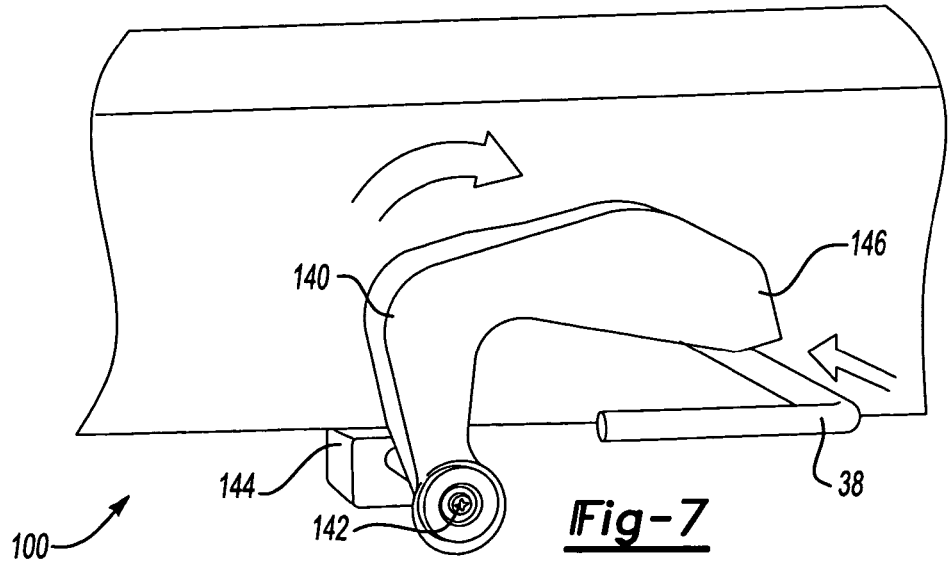
FIG. 7 shows the preferred embodiment at a locked position.

FIG. 7 shows the embodiment 100 trying to move from the uncovered position to the covered position when the handle 38 has not been fully returned, or such as when the locking pins are not fully received in the rails. As shown, the outer edge 146 of the cover cannot move past the handle 38 in this position. The preferred embodiment 100 thus provides the benefits as set forth above.

The present invention thus provides a simple method of ensuring the locking pins 22 are locked before allowing the slider S to begin to move. The present invention provides visual feedback, and also provides assurance.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A slider comprising:
   an actuation member for changing a locking pin position, and for driving at least one locking pin between non-engaged and engaged positions;
   a cover movable between a covered position and an uncovered position, with a substantial portion of said actuation member being covered to prevent actuation of said actuation member when said cover is in said covered position; and
   a valve actuated in response to movement of said cover from said covered position to said uncovered position to set a park brake when said cover is in said uncovered position.

2. The slider as set forth in claim 1, wherein said actuation member is movable outwardly of a slider frame to drive said at least one locking pin to said non-engaged position, and wherein said cover includes a blocking structure that prevents movement of said actuation member outwardly of said slider frame when in said covered position.

3. The slider as set forth in claim 1, wherein said cover is mounted to pivot relative to said actuation member between said covered and said uncovered positions.

4. The slider as set forth in claim 3, wherein a valve pin is contacted by said cover when said cover is pivoted away from said covered position, such that said valve pin is provided with feedback of the position of said cover, said valve pin causing said valve to set the park brake.

5. The slider as set forth in claim 1, wherein said cover cannot be moved from said uncovered position to said covered position if said locking pins are not fully received within holes in a trailer frame.

6. The slider as set forth in claim 1, wherein the park brake is mounted on said slider.

7. The slider as set forth in claim 1, wherein a valve pin is contacted by said cover when said cover is moved away from said covered position such that said valve pin is provided with feedback of the position of said cover, said valve pin causing said valve to set the park brake.

8. The slider as set forth in claim 1, wherein said cover pivots with a pivot pin, and said pivot pin being a valve element for actuating a park brake when said cover is pushed in and turned to said uncovered position.

9. The slider as set forth in claim 8, wherein said pivot pin generally pivots about an axis parallel to an axis of movement of said actuation member.

10. The slider as set forth in claim 1, including a valve control element that identifies movement of said cover wherein said valve control element causes said valve to set the park brake when said cover is in said uncovered position.

11. The slider as set forth in claim 10, wherein said valve control element comprises a valve pin that is movable to actuate said valve to set the park brake when said cover is moved to said uncovered position.

12. A vehicle trailer system comprising:
   a slider having a plurality of locking pins, said plurality of locking pins being movable by an actuation member between engaged and non-engaged positions;
   at least one park brake associated with said slider, said at least one park brake being moved between a park position and a release position by a flow of pressurized air;
   a trailer frame rail comprising a plurality of incrementally spaced holes, said plurality of locking pins being moved into selected ones of said plurality of incrementally spaced holes when in said engaged position;
   a cover including a blocking structure that prevents actuation of said actuation member when said cover is in a covered position, and said cover being movable to an uncovered position to allow actuation of said actuation member; and
   a valve actuated in response to movement of said cover from said covered position to said uncovered position to set said at least one park brake when said cover is in said uncovered position.

13. The system as set forth in claim 12, wherein said actuation member is movable outwardly of a slider frame, and said blocking structure prevents movement of said actuation member outwardly of said slider frame when said cover is in said covered position.

14. The system as set forth in claim 12, wherein said cover is mounted to pivot relative to said actuation member between said covered and said uncovered positions.

15. The system as set forth in claim 12, wherein a valve pin is contacted by said cover when said cover is pivoted away from said covered position, such that said valve pin is provided with feedback of the position of said cover, said valve pin causing said valve to set said at least one park brake.

16. The system as set forth in claim 12, wherein said cover cannot be moved from said uncovered position to said covered position if said plurality of locking pins are not fully received within said plurality of incrementally spaced holes in said trailer frame rail.

17. The system as set forth in claim 12, wherein a valve pin is contacted by said cover when said cover is moved away from said covered position such that said valve pin is provided with feedback of the position of said cover, said valve pin causing said valve to set said at least one park brake.

18. The system as set forth in claim 12, wherein said cover pivots with a pivot pin, and said pivot pin being a valve element for actuating a park brake when said cover is pushed in and turned to said uncovered position.

19. The system as set forth in claim 18, wherein said pivot pin generally pivots about an axis parallel to an axis of movement of said actuation member.

20. The system as set forth in claim 12, including a valve control element that identifies movement of said cover wherein said valve control element causes said valve to set the park brake when said cover is in said uncovered position.

21. The system as set forth in claim 20, wherein said valve control element comprises a valve pin that is movable to actuate said valve to set the park brake when said cover is moved to said uncovered position.

* * * * *